United States Patent [19]

Lacour

[11] 4,006,426
[45] Feb. 1, 1977

[54] DEVICE FOR TREATING A LASER LIGHT PULSE

[75] Inventor: Bernard Lacour, Villebon-sur-Yvette, France

[73] Assignee: Compagnie Industrielle des Lasers, Marcoussis, France

[22] Filed: Dec. 1, 1975

[21] Appl. No.: 636,493

[30] Foreign Application Priority Data

Dec. 16, 1974 France ............................ 74.41380

[52] U.S. Cl. ............................ 330/4.3; 331/94.5 C; 350/157
[51] Int. Cl.² ............................ H01S 3/09
[58] Field of Search ............... 330/4.3; 331/94.5 C, 331/94.5 M; 350/157, 159

[56] References Cited

UNITED STATES PATENTS 3,453,559   7/1969   Sharp et al. ........................ 330/4.3

OTHER PUBLICATIONS

Electronics, "Feedback Boosts Laser Beam", Electronics 12-13-63, pp. 42-43.

*Primary Examiner*—Edward S. Bauer
*Assistant Examiner*—Wm. H. Punter
*Attorney, Agent, or Firm*—Sughrue, Rothwell, Mion, Zinn & Macpeak

[57] ABSTRACT

The invention concerns a device for treating a laser light pulse and comprises, aligned successively on a same axis, a polarizer, an optical rotator, semi-reflecting plates and a reflector. The device can be applied to high-power lasers.

3 Claims, 3 Drawing Figures

DEVICE FOR TREATING A LASER LIGHT PULSE

BACKGROUND OF THE INVENTION

1. Field of the Invention

The present invention concerns a device for treating a laser light pulse.

2. Description of the Prior Art

It is known how to obtain short laser light pulses. For example, lasers operating in the blocked mode emit pulses whose duration is in the order of a few tens of picoseconds. Lasers triggered by rotating prisms or by electro-optical cells emit pulses lasting a few tens of nanoseconds and it is possible, by means of a cutting out system, to reduce the duration of those pulses down to about two nanoseconds.

On the other hand it is difficult to obtain laser pulses in an intermediate range whose duration is comprised between a hundred or so picoseconds and 2 nanoseconds. It is also difficult to obtain pulses whose form, that is, whose amplitude curve, as a function of time, corresponds to that required in certain applications.

The aim of the present invention is to solve those difficulties and to produce a device making it possible to obtain, from a laser pulse having a very short duration, a longer pulse having a predetermined form.

SUMMARY OF THE INVENTION

The present invention has as its object a device for treating a laser pulse propagating along an axis, characterized in that it comprises, centred on that axis:

a polarizer arranged for polarizing the said light in a first plane;

an optical quarter wave plate suitable for transforming the light transmitted by the said polarizer into a circularly polarized light;

a semi-transparent mirror for sending a part of the said circularly polarized light back to the said plate and to allow the other part to pass, so that after the crossing of that plate, that part of the light is transformed into a light polarized in a second plane perpendicular to the said first plane, the said polarizer being suitable for reflecting out of the said axis the polarized light in the said second plane;

and a reflector suitable for reflecting completely the said laser light and arranged beyond the said mirror for sending back to that mirror the said other part of the light.

The present invention is described hereinbelow with reference to the accompanying drawing, given by way of illustration but having no limiting character.

DESCRIPTION OF THE PREFERRED EMBODIMENT

Figure 1:
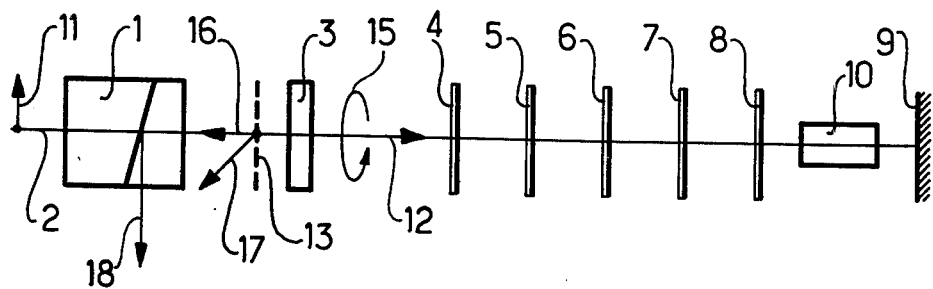
FIG. 1 shows diagrammatically an embodiment of the device according to the invention.

FIG. 1 shows a device comprising a polarizer 1 such as a GLAN prism, centred on an axis 2. An optical quarter wave plate 3 is arranged on the same axis. A semi-transparent mirror 4 is arranged on the axis 2 and centred on that axis, beside the plate 3, but on the opposite side to the polarizer 1. Although the device can comprise one semi-transparent mirror 4 only, other mirrors of that type such as 5, 6, 7 and 8 arranged one behind the other beyond the mirror 4 are arranged preferably on the axis 2. The device comprises, moreover, a totally reflecting reflector 9 also centred on the axis 2 and arranged beyond the furthest mirror 8 from the plate 3. A laser amplifier 10 centred on the axis 2 can be arranged between the mirror 8 and the reflector 9.

The device shown in FIG. 1 operates as follows. A laser pulse 11 is propagated along the axis 2 in a direction shown by the arrow 12 so as to meet successively the polarizer 1, the plate 3, the mirrors 4 to 8, the amplifier 10 and the reflector 9. The pulse 11 is transmitted by the polarizer 1 in a polarization plane passing through the axis 2 and indicated by an axis 13 cutting the axis 2 perpendicularly, that polarization plane being the very same plane as in FIG. 1. The laser pulse then crosses the plate 3 which transforms the rectilinear polarization of the laser light into circular polarization. The pulse emerging from the plate 3 is shown at 15. The pulse 15 then crosses the various semi-transparent mirrors 4, 5, 6, 7 and 8. Each of these mirrors sends back to the plate 3 a part of the laser light which it receives and allows the other part to pass. Thus, the mirror 4 sends back towards the plate 3 in the direction of the arrow 16 a part of the pulse 15 which crosses the plate 3, this causing a transformation of the circular polarization into a rectilinear polarization whose axis 17 is perpendicular to the original polarization plane defined by the axes 2 and 13. The polarizer 1 reflects the pulse 17 outside the axis 2 along an axis 18. Each semi-transparent mirror thus sends back to the polarizer 1 a part of the laser pulse which it receives and the polarizer 1 reflects along the axis 18 five pulses which are staggered in relation to one another by an interval of time which corresponds to twice the optical path with separates the mirror in question from the preceding mirror. The laser pulse having crossed the mirror 8 is amplified in the amplifier 10 and the reflector 9 therefore sends back to the polarizer 1 a last high-power pulse reflected along the axis 18. Each of these pulses, called elementary pulses, is reflected by the polarizer 1 along the axis 18 because it is polarized perpendicularly to the polarization plane of the polarizer 1.

A part of the elementary pulses and more particularly a part of the high-power pulse is reflected again on the semi-transparent mirrors, this giving rise again to small pulses whose amplitude is very much smaller and whose effect is the more often negligible.

Figure 2:
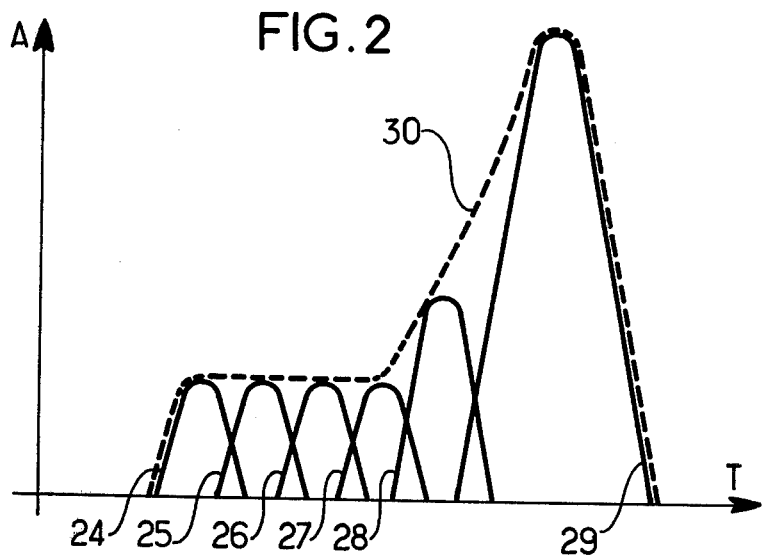
FIG. 2 is a diagram showing the form of the output pulse obtained by means of the device shown in FIG. 1.

FIG. 2 shows the curve, as a function of the time T, of the amplitude A of the successive elementary pulses 24, 25, 26, 27, 28 and 29, reflected along the axis 18 after they have been sent back by the mirrors 4, 5, 6, 7 and 8 and by the reflector 9; the small pulses mentioned above have not been shown. It has been assumed that each of the mirrors 4 to 7 has a same fairly slight reflection coefficient, the reflection coefficient of the mirror 8 being higher. The curve 30 traced in discontinuous lines represents the output pulse whose amplitude corresponds to the sum of the amplitudes of the various elementary pulses. The duration of the output pulse is evidently greater than that of the input pulse. It will be understood that by choosing suitably the duration of the original laser pulse, the reflection coefficients of the various semi-reflecting mirrors and the distances between those mirrors and the reflector, it is possible to obtain, at the output of the device, a pulse having a predetermined duration and form. More particularly, it is possible to set up, due, more particularly to the presence of the amplifier 10, a pulse whose amplitude increases first slowly then in a quasi exponential manner to decrease subsequently very rapidly, such as the pulse 30 shown in FIG. 2. It is useful to obtain a laser pulse having that form, more particularly when it is required to generate a plasma at high temperature by concentration of the energy of a laser pulse. It is possible, for example, with an original laser pulse of 100 picoseconds, to choose semi-reflecting mirrors spaced apart by 15 millimeters and representing for the mirrors 4, 5, 6 and 7, a reflection coefficient of 1 percent and for the mirror 8, a reflection coefficient of 2 percent: an output pulse whose amplitude is the sum of the amplitudes of six elementary pulses is then obtained. The maximum amplitudes of those elementary pulses are respectively proportional to the numbers 1-1-1-1-7-80, if the device does not comprise any amplifier. With an amplifier 10, the relative amplitude of the last elementary pulse can be brought from 80 to 400 approximately at the maximum, that amplitude being mainly limited by the fact that, for high amplification ratios, there is a danger of producing a spurious laser oscillation in the cavities constituted by each of the semi-reflecting mirrors and the reflector. The duration of the output pulse can be, in that case, in the order of 800 picoseconds.

Figure 3:
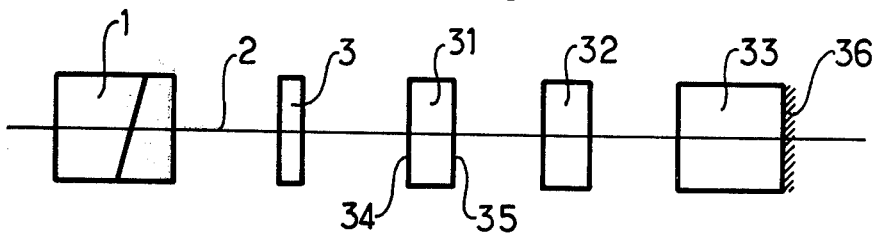
FIG. 3 shows diagrammatically another embodiment of the device according to the invention.

FIG. 3 shows another embodiment of the device according to the invention, comprising, centred on an axis 2, a polarizer and a quarter wave plate 3 absolutely analogous to the elements bearing the same reference shown in FIG. 1. In that device shown in FIG. 3, the semi-reflecting mirrors are constituted by the input faces and output faces such as 34 and 35 of optical plates having parallel faces 31, 32, 33 centred on the axis 2 and the reflector is constituted by the end face 36 of the plate 33, that face being treated to reflect totally the laser light. It is known that when there is no treatment, the faces of the plates having parallel faces have a reflection coefficient in the order of 4 percent.

It should be observed that the device according to the invention is very easy to align, for all the optical elements which constitute it are centred on a same axis.

The device according to the invention can be applied more particularly to laser generators sending out high-power pulses whose duration is very short.

I claim:

1. A device for treating a laser light pulse propagating along an axis, said device comprising:
   a polarizer centered on said axis for polarizing said light in a first plane;
   an optical quarter wave plate centered on said axis and downstream of said polarizer for transforming the light transmitted by said polarizer into a circularly polarized light;
   a plurality of semi-transparent mirrors centered on said axis and downstream of said optical quarter wave plate for sending a part of said circularly polarized light back to said optical quarter wave plate and to allow the other part to pass therethrough, so that after the crossing of that plate, that part of the light sent back to the plate is transformed into a light polarized in a second plane perpendicular to said first plane, said polarizer being capable of reflecting the polarized light in the second plane out of said axis; and
   a reflector centered on said axis and downstream of said plurality of transparent mirrors for totally reflecting said light for sending back to said plurality of semi-transparent mirrors said other part of the light.

2. The device according to claim 1, wherein said semi-transparent mirrors are constituted by faces of optical plates having parallel faces and wherein said reflector is constituted by one face of one of those plates, that face being treated to make it totally reflecting.

3. The device according to claim 1, further comprising a laser amplifier arranged on said axis between said reflector and the nearest semi-transparent mirror to that reflector.

* * * * *